US009665348B1

(12) United States Patent
Black et al.

(10) Patent No.: US 9,665,348 B1
(45) Date of Patent: May 30, 2017

(54) CUSTOMIZABLE, DUAL-FORMAT PRESENTATION OF INFORMATION ABOUT AN OBJECT IN AN INTERACTIVE PROGRAMMING ENVIORNMENT

(75) Inventors: Jennifer Anne Black, Ashland, MA (US); Michelle T. Hirsch, Westborough, MA (US); David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/489,948

(22) Filed: Jun. 6, 2012

Related U.S. Application Data

(60) Provisional application No. 61/494,254, filed on Jun. 7, 2011.

(51) Int. Cl.
*G06F 3/00* (2006.01)
*G06F 17/00* (2006.01)
*G06F 9/44* (2006.01)
*G06F 9/54* (2006.01)
*G06F 17/21* (2006.01)

(52) U.S. Cl.
CPC .................. *G06F 8/24* (2013.01); *G06F 8/33* (2013.01); *G06F 9/54* (2013.01); *G06F 17/212* (2013.01)

(58) Field of Classification Search
CPC ................................ G06F 9/54; G06F 17/212
USPC ........................................... 719/310; 715/243
See application file for complete search history.

(56) References Cited

U.S. PATENT DOCUMENTS

| 6,286,131 | B1 | 9/2001 | Beers et al. | |
|---|---|---|---|---|
| 7,603,657 | B2 * | 10/2009 | Gassner et al. | 717/113 |
| 7,657,873 | B2 * | 2/2010 | Horton et al. | 717/125 |
| 7,716,037 | B2 | 5/2010 | Precoda et al. | |
| 8,713,515 | B1 | 4/2014 | Biggerstaff | |
| 8,930,881 | B1 * | 1/2015 | Eddins et al. | 717/100 |
| 2006/0265415 | A1 | 11/2006 | Abrams et al. | |
| 2007/0043579 | A1 | 2/2007 | Kent et al. | |
| 2007/0234301 | A1 | 10/2007 | Garvey et al. | |
| 2008/0141238 | A1 | 6/2008 | Balassanian | |
| 2009/0287470 | A1 | 11/2009 | Farnsworth et al. | |

(Continued)

OTHER PUBLICATIONS

Suman, a comparative Analysis of Meta-programming and Aspect-Orientation, 2003.*

(Continued)

*Primary Examiner* — Lechi Truong
(74) *Attorney, Agent, or Firm* — Harrity & Harrity, LLP

(57) ABSTRACT

A device may provide an interface for an interactive programming environment and may receive a command to display information about an object. The device may provide, based on the command, the information about the object, using: a first display interface that presents the information about the object in a first format that is applicable to users of the object. A second display interface, for the object, may present the information about the object in a second format, different from the first format, the second format including information about the object that is applicable to authors of the class or to authors of subclasses corresponding to the object. The first and second display interface may present the information, about the object, based on a state of the object and/or based on a display section of the information (e.g., certain information may be presented in a header section of the display).

25 Claims, 10 Drawing Sheets

(56) References Cited

U.S. PATENT DOCUMENTS

| | | |
|---|---|---|
| 2010/0088686 A1 | 4/2010 | Langworthy et al. |
| 2010/0095282 A1 | 4/2010 | Thunemann |
| 2011/0167248 A1 | 7/2011 | Gafter et al. |
| 2013/0159433 A1 | 6/2013 | Chavan |
| 2013/0219354 A1 | 8/2013 | Chakrapani Rao et al. |
| 2013/0239006 A1 | 9/2013 | Tolkachev |
| 2013/0282365 A1 | 10/2013 | Van De Ven et al. |
| 2014/0189637 A1 | 7/2014 | Wu |

OTHER PUBLICATIONS

Steve McConnell, "Chapter 11: Variable Names" from *Code Complete 2nd Edition*, Jan. 13, 2004, © 2004, 33 pages.

Richard K. Johnson, "Chapter 3: Naming" from *Elements of MATLAB Style*, © 2011, pp. 18-48.

\* cited by examiner

```
%State handler methods - customized by a class author who needs a high
%degree of control over the display when the object is in a given state
methods(Access = protected)
    displayEmptyObject(obj)
    displayNonscalarObject(obj)
    displayScalarObject(obj)
end %Hook methods called by the default implementations of the state
handlers.
%Implemented by a class author to provide content for a specific section
%of the display.
methods(Access = protected)
    headerText = getHeader(obj)
    groups = getPropertyGroups(obj)
    footerText = getFooter(obj)
end
```

Fig. 9A

```
classdef Channel < matlab.mixin.CustomDisplay
    methods(Access = protected)
        function displayScalarObject(obj)
            %implementation of the scalar display
            %for this class
        end
    end
end
```

Fig. 9B

```
classdef SignalReader < matlab.mixin.CustomDisplay
    function hdr = getHeader(obj)
        if isscalar(obj)
            str = sprintf('Ensemble with %i bagged decision trees:', obj.NTrees);
        else
            str = getHeader@matlab.mixin.CustomDisplay(obj)
        end
    end
end
```

Fig. 9C

CUSTOMIZABLE, DUAL-FORMAT PRESENTATION OF INFORMATION ABOUT AN OBJECT IN AN INTERACTIVE PROGRAMMING ENVIORNMENT

RELATED APPLICATIONS

This application claims priority to U.S. Provisional Patent Application No. 61/494,254, filed Jun. 7, 2011, the disclosure of which is incorporated by reference herein.

BACKGROUND

Technical computing environments are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks, such as research and product development.

Existing technical computing environments may include graphical and/or textual interfaces through which users may interact with the technical computing environment. Some technical computing environments may include a command-line interface through which users may create and/or interact with technical programs. The technical programs may include classes, where a class may be defined as a programming construct that is used to create instances of itself, referred to as a class instance, class object, or object. A class may define constituent members, which enables objects corresponding to the class, to have state and behavior. Typically, multiple objects may be instantiated from a single class.

When working with objects and classes in a command-line interface, commands may be provided through which users can inspect (i.e., display information about) objects. For example, a user may wish to view the publicly visible properties of a particular object. The user may, for example, type a name of the object and the name of a display command to obtain information about the object. In response, information about the object may be presented in the command-line interface.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 9A-9C are diagrams of examples of code fragments illustrating display customizations that may be implemented using a customized display interface.

DETAILED DESCRIPTION

The following detailed description refers to the accompanying drawings. The same reference numbers in different drawings may identify the same or similar elements.

Figure 1:
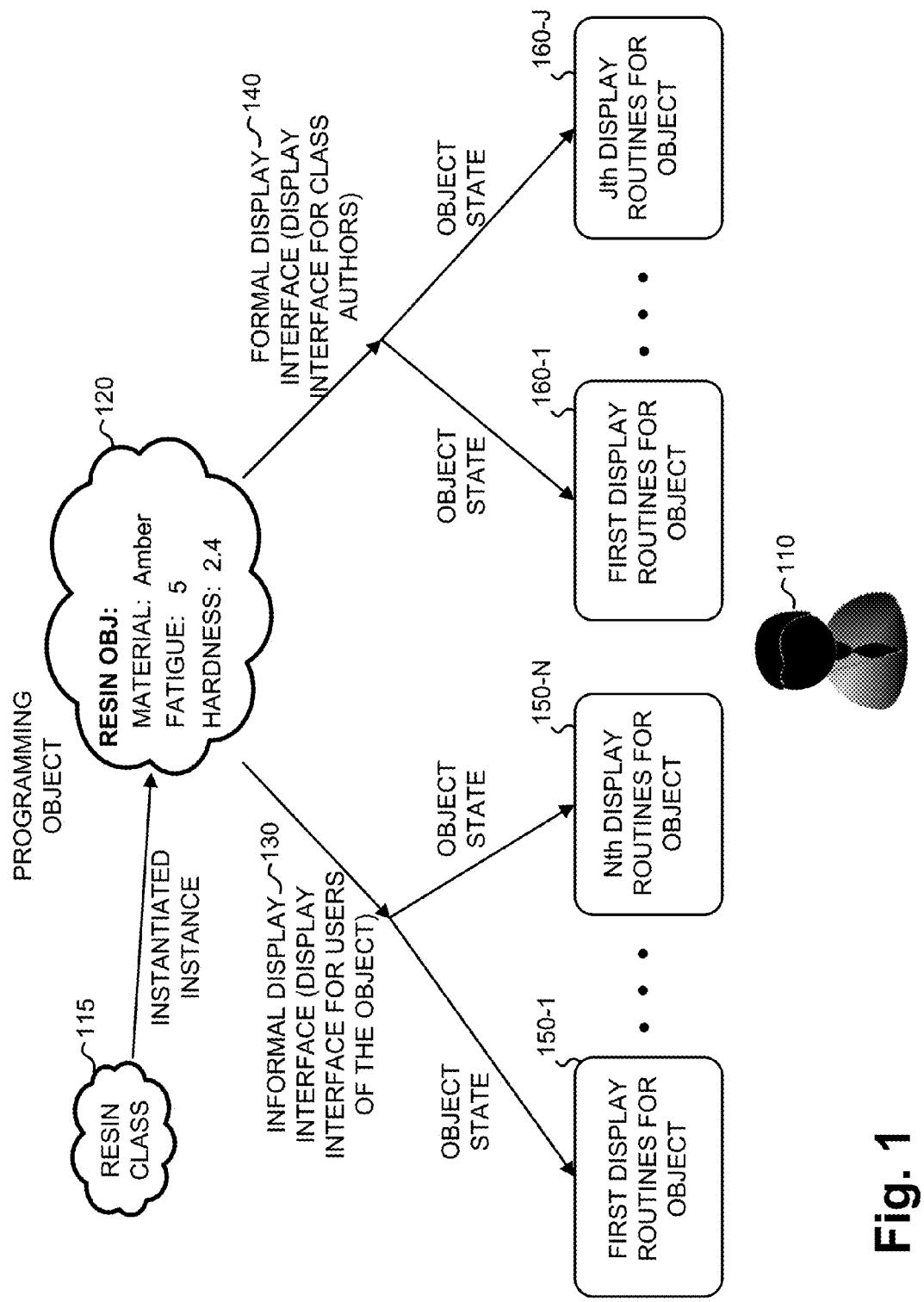
FIG. 1 is a diagram illustrating an example overview of concepts described herein.

FIG. 1 is a diagram illustrating an overview of concepts described herein. As illustrated, a user 110, of a technical computing environment, may work with classes and objects when creating programs in the technical computing environment. A class may be defined as a programming construct that is used to create instances of itself (the objects). The user may choose to display information about a particular object. For example, while working in a command-line interface of the technical computing environment, the user may enter a command that causes the technical computing environment to present information about the object.

In FIG. 1, an object 120 is particularly illustrated. Object 120 may be an instance of a resin class 115 and may be an object that represents a resin. Resins may have properties that define a particular resin, such as a material type of the resin, a fatigue value for the resin, and a hardness value for the resin. These properties are illustrated, in FIG. 1, as being associated with object 120.

User 110, while working with object 120, may wish to display information about object 120, such as the values of the properties of object 120. Depending on preferences of user 110 and/or on the type of work being performed by user 110, it may be desirable to show different information and/or to differently format the information, that is provided for object 120. In one implementation, the technical computing environment may provide an informal display interface for objects, intended for casual users, where a casual user may refer to a user that is primarily interested in using object 120 to perform technical tasks (e.g., engineering, scientific, or math tasks) with the technical computing environment. The technical computing environment may also provide a formal display interface that is intended for authors of classes or subclasses. Authors of classes or subclasses may include, for example, programmers that create classes or subclasses that may then be used to perform technical tasks. The informal display interface is illustrated in FIG. 1 as interface 130 and the formal display interface is illustrated in FIG. 1 as interface 140.

Informal display interface 130 may be triggered, for an object, by user 110 entering a first display command for the object. For example, the name of the object may be entered to trigger informal interface 130. Informal interface 130 may include a number of display routines, labeled as display routines 150-1 through 150-N (N>=2) that present different views of the object based on a state of the object. The state of an object may be defined based on the values associated with members of the object, such as properties and methods of the object, and/or based on the configuration of the object itself (e.g. whether the object is configured as an array). For example, a scalar object may be displayed differently than a non-scalar object.

Formal display interface 140 may be triggered, for an object, by user 110 entering a second display command for the object. For example, a command such as "details," followed by the object name, may be entered to trigger formal interface 140. Similar to informal interface 130, formal interface 140 may include a number of display routines, labeled as display routines 160-1 through 160-J (J>=2) that present different views of the object based on a state of the object. For example, a scalar object may be displayed differently than a non-scalar object.

In general, informal display interface 130 may be configured to present information about object 120 in such a way that the information includes information that is particularly relevant to users of object 120 that are performing technical tasks. These types of users may be particularly interested in properties of object 120. Formal display interface 140 may be configured to present information about object 120 in such a way that the information includes information that is particularly relevant to authors of classes or subclasses. In addition to the properties of object 120, authors of classes or subclasses may be interested in methods, events, and/or superclasses of object 120, and/or other information that may be useful to someone that is programming or modifying a class.

In some implementations, one or more of interfaces 130 and 140 may be customizable, on a per-class basis, by class authors. For example, informal display interface 130 may be customizable by a class author. The ability to customize a class may be provided through display customization logic that can be called by a class author. The display customization logic may be used to customize selected ones of display routines 150 while leaving other ones of display routines 150 as the default display routines, which may be automatically associated with an object by the technical computing environment.

System Description

A technical computing environment (TCE) may include any hardware and/or software based logic that provides a computing environment that allows users to perform tasks related to disciplines, such as, but not limited to, mathematics, science, engineering, medicine, and business. The TCE may include text-based facilities or a graphically-based environment, or a combination of a text-based and graphically-based environment. In one implementation, the TCE may include software that generally provides a text-based interface, but may include some graphical aspects, such as the providing of graphical hyperlinks, in a command-line interface, that when selected, opens a graphical window (e.g., a browser window). In another possible implementation, the TCE may include a graphical interface, such as one in which a user may program models using graphical blocks, that also provides a text-based interface for certain functionality.

Figure 2:
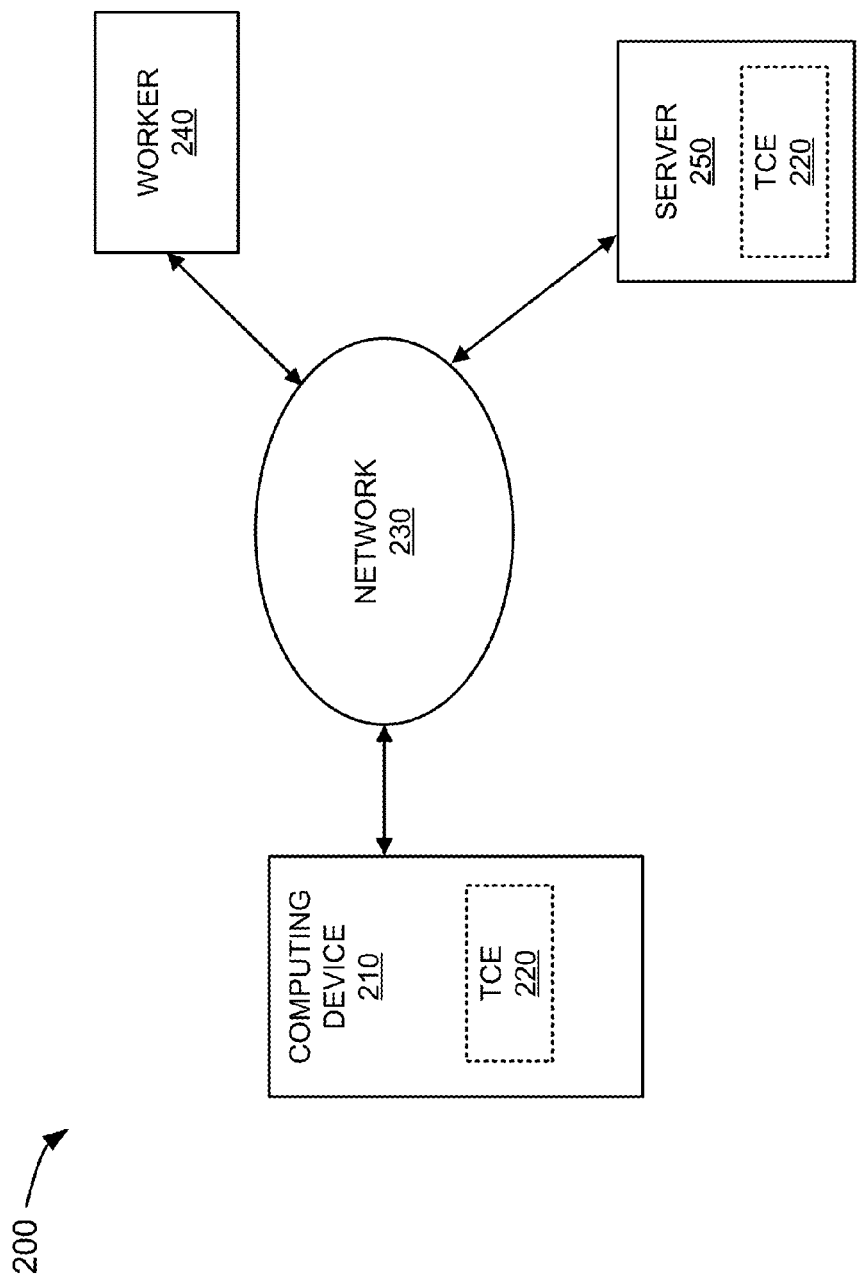
FIG. 2 is diagram of an example system in which concepts described herein may be implemented.

FIG. 2 is diagram of an example environment 200 in which concepts described herein may be implemented. Environment 200 may include a computing device 210, a technical computing environment (TCE) 220, a network 230, a worker 240, and a server 250. The quantity of devices and/or networks, illustrated in FIG. 2, is provided for explanatory purposes only. In practice, there may be additional devices and/or networks; fewer devices and/or networks; different devices and/or networks; and/or differently arranged devices and/or networks than illustrated in FIG. 2. Also, in some implementations, one or more of the devices and/or networks, of environment 200, may perform one or more functions described as being performed by another one or more of the devices and/or networks of environment 200. Devices of environment 200 may interconnect via wired connections, wireless connections, or a combination of wired and wireless connections.

Computing device 210 may include one or more devices (e.g., a personal computer, a laptop, a tablet computer, a server device, a wireless device, such as a mobile phone, a smart phone, or a personal digital assistant (PDA), or the like), or other types of computation or communication devices, that gather, process, search, store, and/or provide information in a manner similar to that described herein. In one example implementation, computing device 210 may host TCE 220 and may execute TCE 220 to provide an interactive command-line interface (e.g., an interactive programming interface) in which information about an object may be displayed in different formats. Additionally, or alternatively, computing device 210 may implement one or more functions, as part of TCE 220, by communicating with worker 240 and/or by accessing a TCE service by communicating with server 250.

TCE 220 may include an application that is stored on and/or executed by computing device 210. TCE 220 may provide, for display on computing device 210, a user interface that enables design, analysis, and generation of, for example, technical applications, engineered systems, and/or business applications. For example, TCE 220 may provide a numerical and/or symbolic computing environment that allows for matrix manipulation, plotting of functions and data, implementation of algorithms, creation of user interfaces, and/or interfacing with programs in other languages. TCE 220 may include a graphical modeling component and a component to convert graphic models into other forms, such as computer source code (e.g., C++ code) or hardware descriptions (e.g., a description of an electronic circuit). TCE 220 may be run by multiple networked computing devices 210. In such an implementation, TCE 220 may be executed in a distributed manner, such as by executing on multiple computing devices 210 simultaneously.

Network 230 may include one or more wired and/or wireless networks. For example, network 230 may include a cellular network, the Public Land Mobile Network (PLMN), a public switched telephone network (PSTN), and/or a second generation (2G) network, a third generation (3G) network, a fourth generation (4G) network, a fifth generation (5G) network, and/or another network (e.g., a long term evolution (LTE) network). Additionally, or alternatively, network 230 may include a local area network (LAN), a wide area network (WAN), a metropolitan area network (MAN), an ad hoc network, an intranet, the Internet, and/or a combination of these or other types of networks.

Worker 240 may include one or more devices (e.g., a personal computer, a laptop, a tablet computer, a server device, a wireless device, such as a mobile phone, a smart phone, or a personal digital assistant (PDA), or the like), or other types of computation or communication devices running one or more instantiations of a TCE. In one example implementation, worker 240 may include a remotely located computing device 210 running TCE 220. In an embodiment, worker 240 may be a virtual instance of TCE 220 running on a processing device, such as server 250, alone or in combination with other instances of workers.

Server 250 may include one or more server devices or other types of computation or communication devices that provide access to a TCE, as a remote service, via network 230. Server 250 may provide results of the simulation to user device 210 and/or may publish the results as a service to be subscribed to by user device 210. Additionally, or alternatively, access to TCE 220 may be provided as a web service. The web service may provide access to one or more programs provided by server 250.

Figure 3:
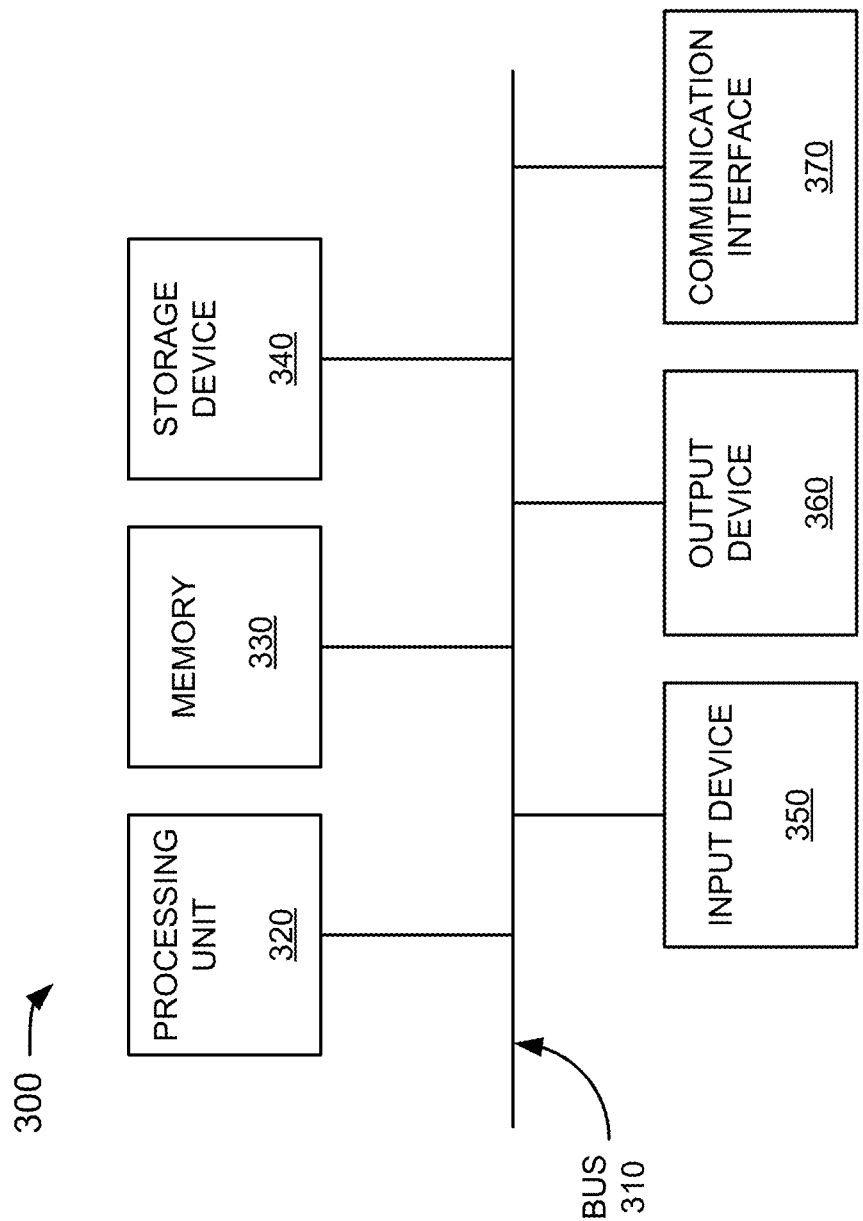
FIG. 3 is a diagram of an example device that may correspond to a workstation, or another device, shown in FIG. 2.

FIG. 3 is a diagram of an example device 300 that may correspond to computing device 210, worker 240, or server 250. As illustrated, device 300 may include a bus 310, a processing unit 320, a memory 330, a storage device 340, an input device 350, an output device 360, and/or a communication interface 370. Bus 310 may include a path that permits communication among the components of workstation 300.

Processing unit 320 may interpret and/or execute instructions. For example, processing unit 320 may include a general-purpose processor, a microprocessor, a data processor, a graphical processing unit (GPU), co-processors, a network processor, an application specific integrated circuit (ASICs), an application specific instruction-set processor (ASIP), a system-on-chip (SOC), a controller, a programmable logic device (PLD), a chipset, and/or a field programmable gate array (FPGA).

Memory 330 may store data and/or instructions related to the operation and use of device 300. For example, memory 330 may store data and/or instructions that may be configured to implement an implementation described herein. Memory 330 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage device 340 may store data and/or software related to the operation and use of device 300. For example, storage device 340 may include a hard disk (e.g., a magnetic disk, an optical disk, a magneto-optic disk, a solid state disk), a compact disc (CD), a digital versatile disc (DVD), a floppy disk, a cartridge, a magnetic tape, and/or another type of computer-readable medium, along with a corresponding drive. Memory 330 and/or storage device 340 may also include a storing device external to and/or removable from device 300, such as a Universal Serial Bus (USB) memory stick, a hard disk, etc. In an implementation, storage device 340 may store TCE 220.

Input device 350 may include a mechanism that permits an operator to input information to device 300, such as a keyboard, a mouse, a pen, a single or multi-point touch interface, an accelerometer, a gyroscope, a microphone, voice recognition and/or biometric mechanisms, etc. Output device 360 may include a mechanism that outputs information to the operator, including a display, a printer, a speaker, etc. In the case of a display, the display may be a touch screen display that acts as both an input and an output device. Input device 350 and/or output device 360 may also be haptic type devices, such as joysticks or other devices based on touch.

Communication interface 370 may include any transceiver-like mechanism that enables device 300 to communicate with other devices and/or systems. For example, communication interface 370 may include mechanisms for communicating with another device or system via a network.

As will be described in detail below, device 300 may perform certain operations in response to processing unit 320 executing software instructions contained in a computer-readable medium, such as memory 330. For instance, device 300 may implement TCE 220 by executing software instructions from memory 330. A computer-readable medium may be defined as a non-transitory memory device, where the memory device may include a number of physically, possible distributed, memory devices. The software instructions may be read into memory 330 from another computer-readable medium, such as storage device 340, or from another device via communication interface 370. The software instructions contained in memory 330 may cause processing unit 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

Display of Information about an Object

Figure 4:
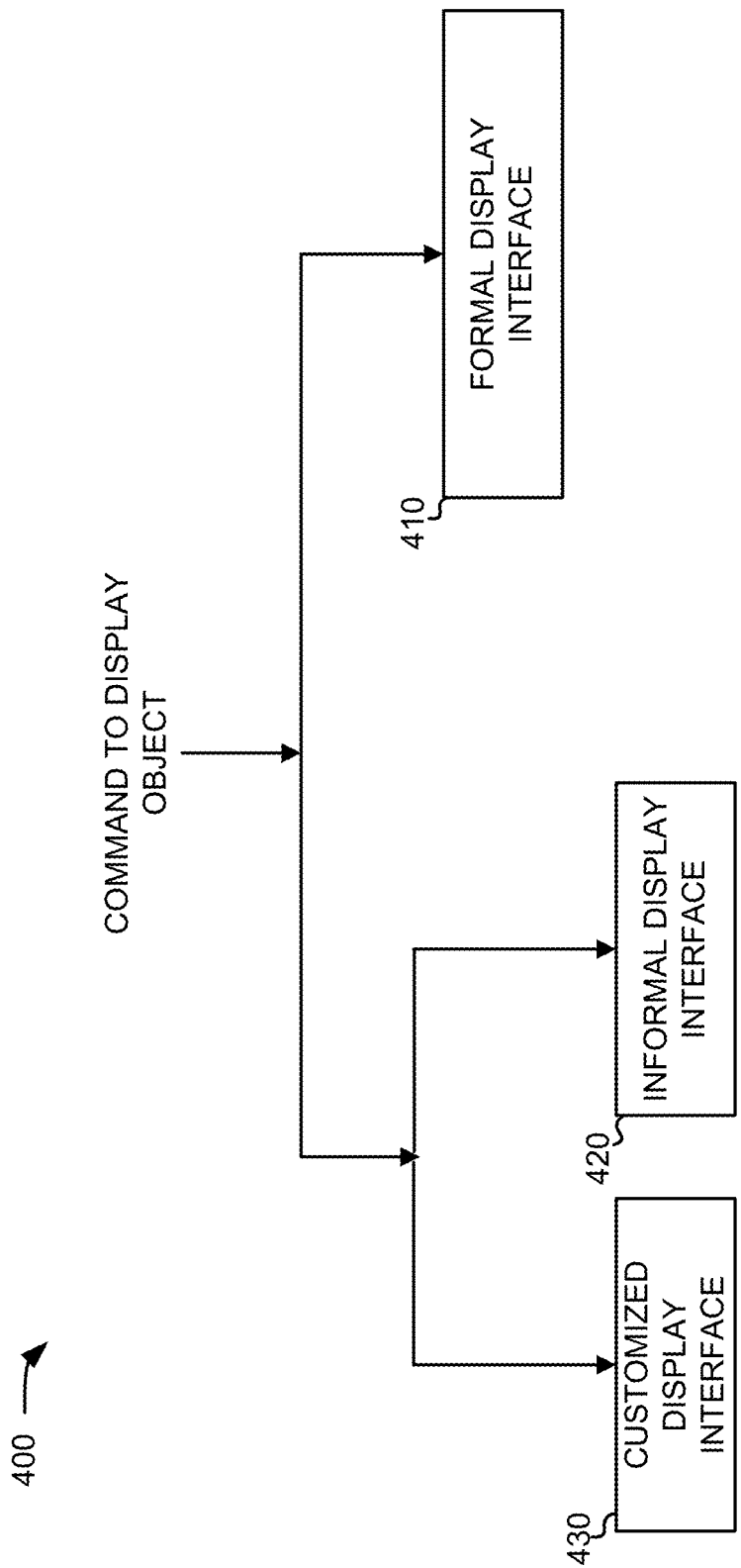
FIG. 4 is a diagram illustrating an example of functional components that may provide information about an object.

FIG. 4 is a diagram illustrating an example of functional components 400 that may provide information about an object. Functional components 400 may correspond, for example, to software components of TCE 220. As illustrated, functional components 400 may include formal display interface 410, informal display interface 420, and customized display interface 430. Display interfaces 410, 420, and 430 may each be display interfaces that display information about objects, such as display interfaces that provide information in a command-line interface that is designed to be interactively used to perform technical tasks.

Information about an object may be provided in response to a user entering a display command in the command-line interface. The display command may indicate whether the user would like to view a casual, or informal information display for the object, or a more detailed (formal) information display for the object. In one implementation, the informal information display may be a display that is designed for or that is most appropriate for users of the object and the formal information display may be designed for authors of classes or subclasses, such as classes or subclasses from which the object is instantiated. In one implementation, the command to provide the informal information display may be a command in which the user simply enters the name of the object or the command to provide the informal information display may include language to trigger the information display followed by the object name (e.g., "disp(object)"). Other triggering language may alternatively be used. The command to provide the formal information display may include language to trigger the formal information display followed by the object name. For example, for an object named "obj1," the command to provide the formal information display about this object may include the command "details(obj1)." Other triggering language may alternatively be used.

Formal display interface 410 may include an interface, such as one implemented through one or more private or hidden methods that are associated with all classes created in TCE 220. When called, formal display interface 410 may provide, to the user, properties associated with the object, methods associated with the object, superclasses associated with the object, events associated with the object, or other members associated with the object. In one implementation, formal display interface 410 may display the class name, for an object, as a fully-qualified class name (e.g., a class name that is specified using the complete name of the class, such as a class name that includes a name of a package or module in which the class is defined). In contrast, a less formal way to display a class name is using a simple class name display. The simple class name display may be used by informal display interface 420.

When the command, entered by the user, indicates that the user would like to view the informal information display, informal display interface 420 or customized display interface 430 may be used to provide the information display. Informal display interface 420 may include an interface, such as one implemented through one or more private or hidden methods that are associated with all classes created in TCE 220.

In one implementation, customized display interface 430 may be provided, in place of informal display interface 420, when a class author has indicated that customized display routines are to be used. For example, customized display interface 430 may be implemented though a customizable mixin class that may be provided by TCE 220. The customizable mixin class may be referenced and used to override informal display interface 420. The customizable mixin class may provide a number of display routines that are similar to those provided in informal display interface 420. The class author, however, may override methods of the customizable mixin class and/or set properties of the customizable mixin class to selectively control various aspects relating to display of an object. For example, as will be described in more detail below, a class author may wish to customize the display of an object when the object includes scalar elements and to use the default display for non-scalar elements.

Customized display interface 430 may support customizations based on the state of an object. For example, a class author may customize the display of an object when the object is scalar, non-scalar, or is an empty object array. Customized display interface 430 may allow a class author to only customize display routines relating to a particular state, while continuing to display other states using default display routines. Although customized display interface 430 is shown, in FIG. 4, as associated with informal display interface 420, in other implementations, customized display interface 430 may be associated with formal display interface or both informal display interface 420 and formal display interface 410 may be customizable.

Customized display interface 430 may also support a number of customizations relating to the layout of the properties for an object. The customizations may relate to: (1) a customized order in which properties of the object are displayed; (2) the ability to show a subset of the properties of the object; (3) customized value formats; (4) the creation of groups of properties; and (5) the creation of groups of properties with customized group headers. Regarding (1), informal display interface 420 may include a default display order for properties of the object, such as the order in which the properties are defined in the corresponding class. Class authors may wish to present the properties in a different order. Regarding (2), some properties of an object may be properties that a class author determines to be properties that a user of the object does not need to view. Regarding (3), a class author may wish to show values of different parameters differently. For example, a parameter that represents a monetary amount may be shown with a dollar sign. Regarding (4) and (5), a class author may desire to display certain properties in a group or to display custom headers for groups of properties.

Although FIG. 4 shows example functional components 400, in other implementations, functional components 400 may contain fewer components, different components, differently arranged components, or additional components than depicted in FIG. 4. Alternatively, or additionally, one or more functional components may perform one or more tasks described as being performed by one or more other functional components.

Figure 5:
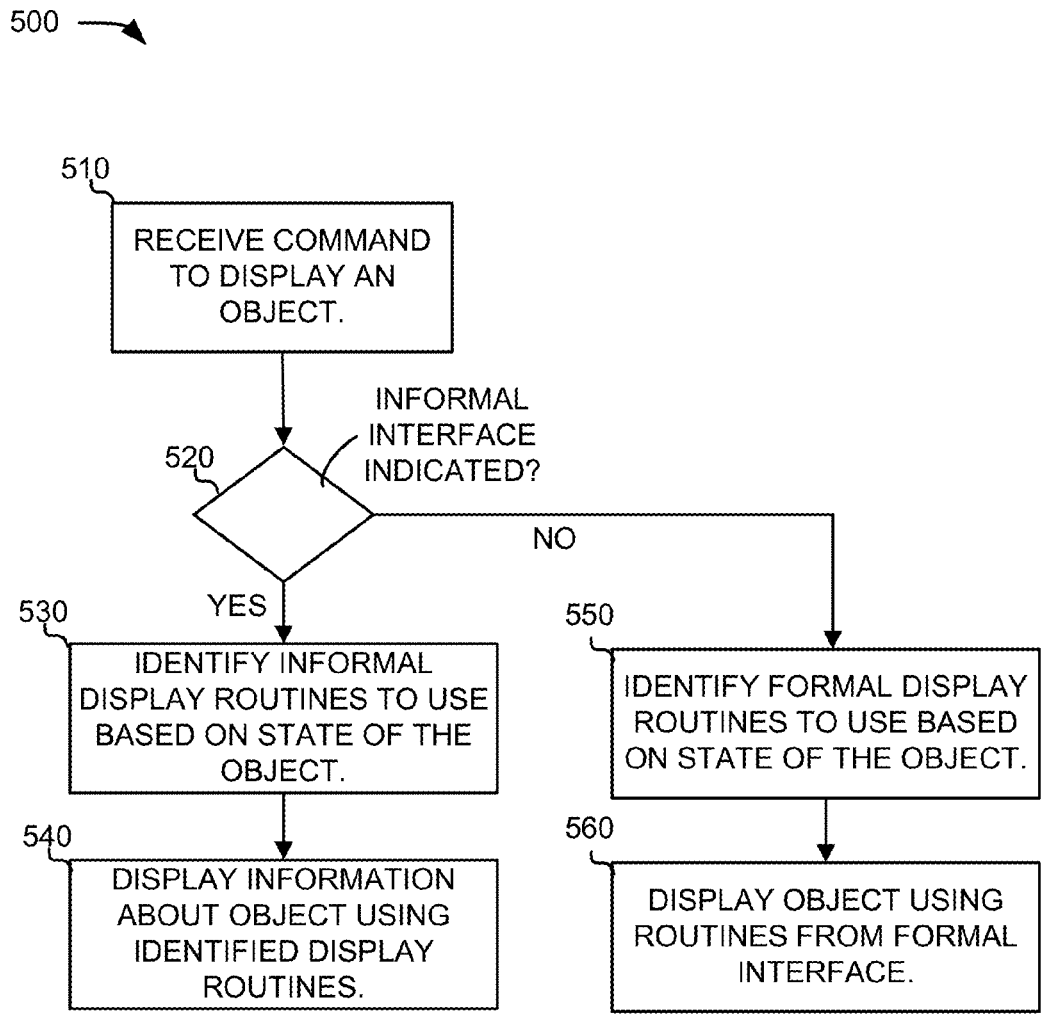
FIG. 5 is a flowchart illustrating an example process for displaying an object.

FIG. 5 is a flowchart illustrating an example process 500 for displaying an object. Process 500 may be performed by, for example, TCE 220 as part of an operation to display an object through a command-line interface that is provided to a user.

Process 500 may include receiving a command to display the object (block 510). The command may indicate whether the informal or formal interface is to be used to display the object. As previously mentioned, for the informal interface, the command may include a text command, such as "disp obj," where "obj" is the name of the object that is to be displayed. In one implementation, the command, for the informal interface, may be indicated by the user entering only the name of the object. That is, the name of the object, entered on a line of the command-line interface, with no other text, may invoke the informal interface. The formal interface may, for example, be invoked with a different command, such as "details(obj)," where "obj" is the name of the object that is to be displayed.

When the informal interface is indicated by the command, (block 520—YES), process 500 may further include identifying, based on a state of the object, display routines to use (block 530). In one implementation, the supported states of the object may include: scalar, non-scalar, and empty. For each of the possible states, one or more display routines may be defined and the appropriate display routine may be selected based on the state of the object. In situations in which customized display interface 430 is implemented, the identified display routines may be custom display routines that were created by the class author when creating or modifying the class. As previously mentioned, in some situations, a class author may implement customized display interface 430, but may still choose to use default display routines for some portions of customized display interface 430.

In some implementations, the identified display routines may additionally include display routines that display information relating to a specific display section of the information that is presented about the object. For example, when displaying information about an object, TCE 220 may present the information segmented into a header section, a body section that includes the properties of the object, and a footer section. Display routines may be defined, as part of informal display interface 420, for each of the header, body, and footer sections of the object. Alternatively, in some situations, in which customized display interface 430 is implemented, the identified display routines, relating to specific display sections, may be custom display routines that were created by the class author when creating or modifying a class.

Process 500 may further include displaying information about the object using the identified informal display routines (block 540). The information may be displayed, for example, as text in a command-line environment.

When the formal interface is indicated by the command, (block 520—NO), process 500 may further include identifying the formal display routines to use based on the state of the object (block 550). As with the informal display routines, in one implementation, the supported states of the object may include: scalar, non-scalar, and empty. For each of the possible states, one or more formal display routines may be selected based on the state of the object.

Process 500 may further include displaying information about the object using the identified formal display routines (block 560). The information may be displayed, for example, as text in a command-line environment.

Figure 6:
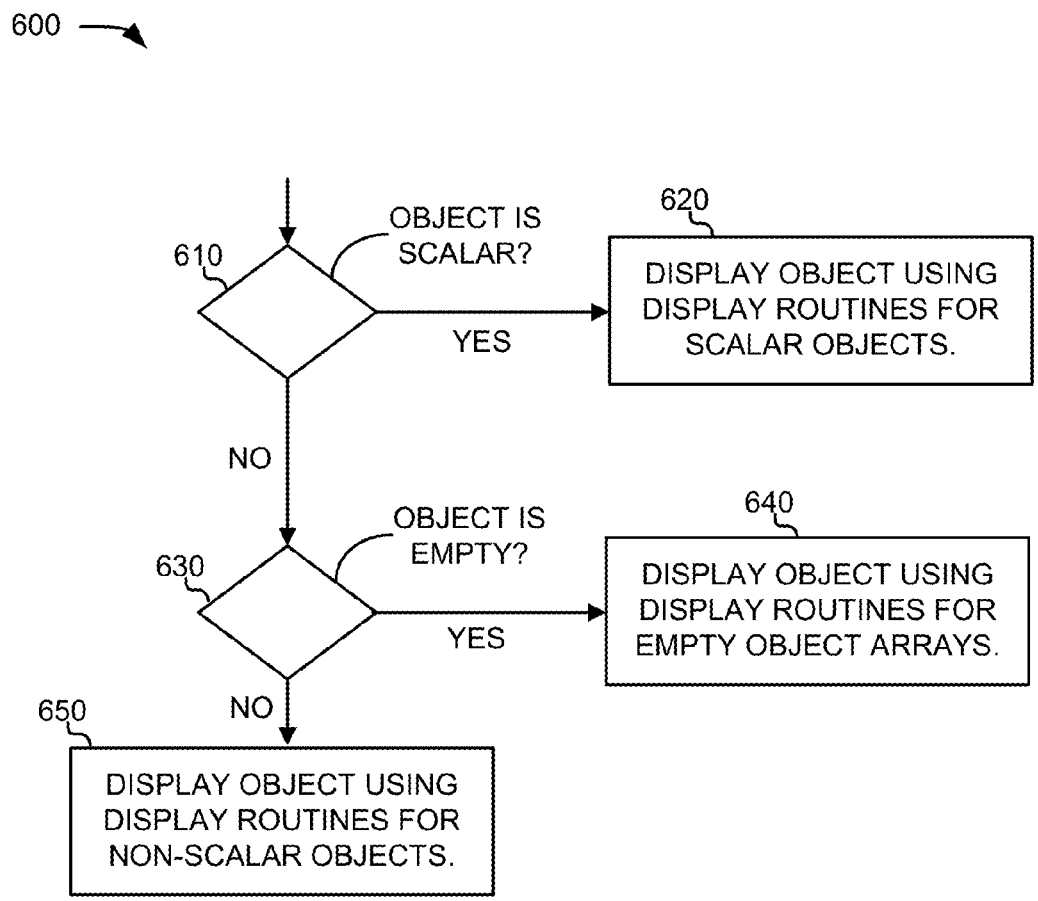
FIG. 6 is a flowchart illustrating an example process for identifying display routines that are to be used to display an object.

FIG. 6 is a flowchart illustrating an example process 600 for identifying the display routines that are to be used to display an object. Process 600 may correspond to block 530 or 550 (FIG. 5). Process 600 may be performed by, for example, TCE 220.

Process 600 may include determining whether the object is a scalar object (block 610). In one implementation, a scalar object may be defined as an object that is not an array or is an array with only one element.

When the object is determined to be a scalar object, (block 610—YES), information relating to the object may be displayed using display routines for scalar objects (block 620). The scalar display routines may be routines that were designed to display scalar values. For example, each property of the object may be displayed as a label identifying the property followed by a textual representation of the value of the property.

When the object is determined to not be a scalar object, (block 610—NO), process 600 may further include determining whether the object is an empty object array (block 630). An empty object array may include, for example, an array of objects for which a class is defined but for which the array may include zero elements.

When the object is determined to be an empty object array (block 630—YES), information relating to the object may be displayed using display routines for empty object arrays (block 640). The display routines, for empty object arrays, may be routines that were designed to display empty objects. For example, each property of the class corresponding to the object may be displayed as a label identifying the property.

When the object is determined to not be an empty object array, (block 630—NO), information relating to the object may be displayed using display routines for non-scalar objects (block 650). The non-scalar display routines may be routines that were designed to display non-scalar values. For example, for an array that includes a number of objects that were instantiated from the same class, a list of labels corresponding to the common properties of the objects may be displayed.

Figure 7:
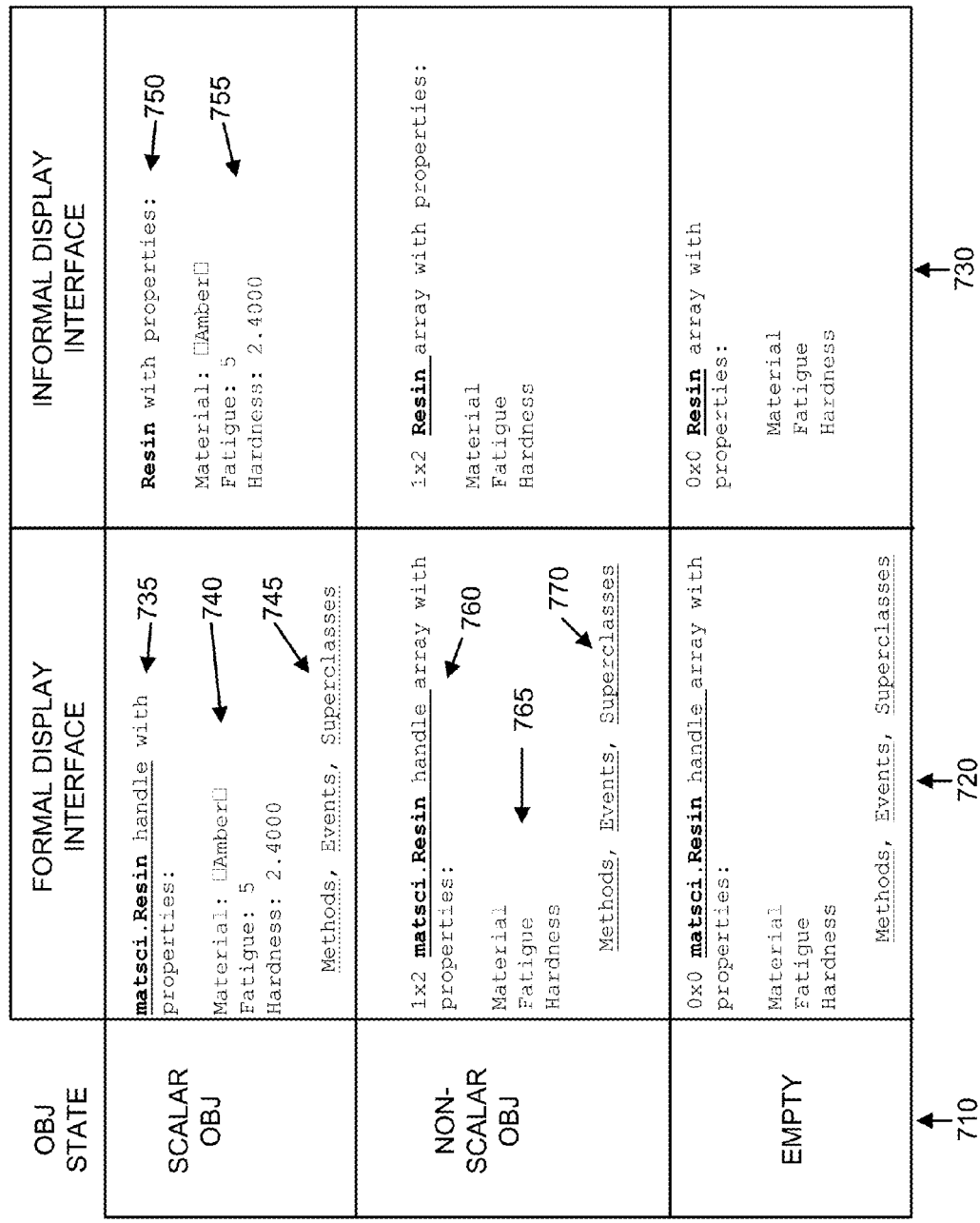
FIG. 7 is a diagram illustrating an example of information that may be presented, on a command-line display, for an example object.

FIG. 7 is a diagram illustrating an example of information that may be presented, on a command-line display, for an example object. Users may interactively work in the command-line interface as part of an interactive programming environment provided by TCE 220. In FIG. 7, column 710 may correspond to the state of the object, column 720 may provide an example of the displayed information for formal display interface 410, and column 730 may provide an example of the displayed information for informal display interface 420. As previously mentioned, formal display interface 410 may generally format the information about an object into a display that is particularly useful for authors of classes or subclasses. Informal display interface 420 may generally format the information about an object into a display that is particularly useful for users of objects instantiated from classes.

As illustrated in FIG. 7, the object display for formal display interface 410 (column 720) may generally provide more information, relative to informal display interface 420 (column 730). For the example object "resin," formal display interface 410 may provide, when "resin" is a scalar object, a header display section 735, a properties display section 740, and a footer display section 745. Header display section 735 may provide a fully qualified name of the "resin" object ("matsci.Resin handle"). Properties display section 740 may provide a list of properties in the object, and footer display section 745 may provide a list of other members of the object (e.g., methods, events, and superclasses). As illustrated, some of the information provided in display sections 735, 740, and 745 may be provided as a link, in which selection of the link by the user may cause additional information to be displayed. For example, the members in footer section 745 may each be shown as links, where selection of a link may open another window that provides additional information (e.g., selection of the "methods" link may open another window that displays a list of methods of the object).

Informal display interface 420 may provide, when "resin" is a scalar object, a header display section 750 and a properties display section 755. Header display section 750 may be similar to header display section 735, but may only include an abbreviated (non-fully qualified) name of the object. Properties display section 755 may be similar to properties display section 740. Informal display interface 420 may omit the footer display section that was provided by formal display interface 410.

Example display information, corresponding to a non-scalar state and an empty state, for the "resin" object, are additionally shown in FIG. 7. As illustrated, for the non-scalar state, formal display interface 410 may provide header display section 760, properties display section 765, and footer display section 770, which may be generally similar to display sections 735-745, respectively. Header display section 760 may, however, additionally include an indication of the size of the array (e.g., 1×2) that contains the "resin" object. Properties display section 765 may display a list of the names of the properties in the "resin" object but may not include values for the properties. The display information for the non-scalar state, corresponding to informal display interface 420, may similarly include an indication of the size of the array and may include a properties display section that does not include values for the properties.

The empty state of an object may correspond to an object that is associated with a class but not instantiated or is instantiated in an array of size zero. In the illustrated example, the empty state may be displayed in a manner similar to the non-scalar object display. However, the size of the array may be indicated as being of size zero (e.g., 0×0).

As previously discussed, when customizing the display interface for an object, a class author may modify display routines corresponding to the state and/or specific display sections. TCE 220 may select the display routines, based on the object state, from a default set of display routines that are provided for objects or from customized display routines. Customized display interface 430 may include callable methods through which a class author may obtain information relating to a particular display section of the display interface. For example, a class author may obtain the default header text for an object, a list of properties for the object, and/or the default footer text for an object. The class author may modify this text to customize the display for an object based on the display section. For example, a class author may control the order in which properties are listed, the number of properties to display, and/or the creation of property groupings.

Figure 8:
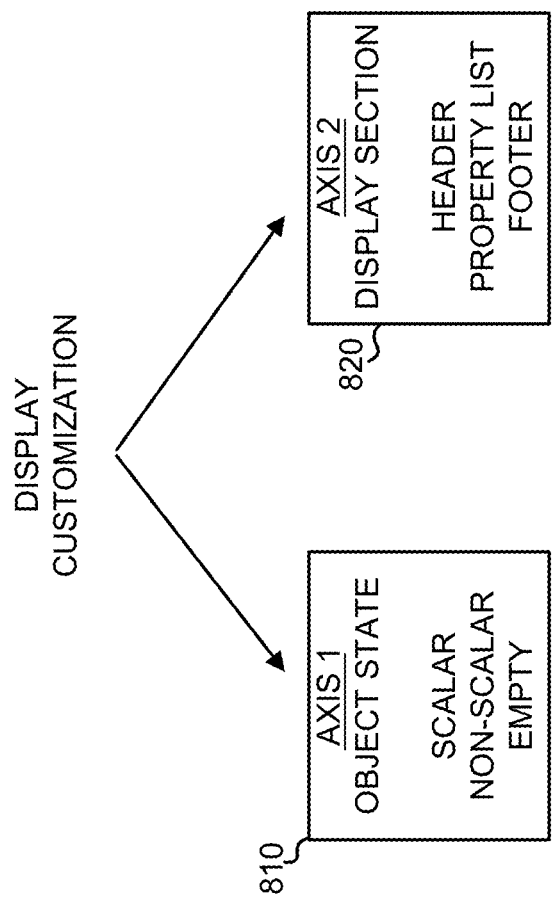
FIG. 8 is a diagram conceptually illustrating customization options through which a class author may customize the display of an object.

FIG. 8 is a diagram conceptually illustrating customization options through which a class author may customize the display of an object. The display of an object may be customized based on the state of the object and/or based on display sections. These two techniques for customizing the display of an object may be conceptualized as display customization along two axes of customization: object state customization (block 810) and display section customization (block 820). As previously discussed, customized display interface 430 may allow class authors to customize the display of objects. The customization may be performed based on particular display sections for information corresponding to the object. Additional details relating to one example technique for implementing customized display interface 430 to provide for customization based on object state and/or display section will be described in more detail with reference to FIGS. 9A-9C.

FIGS. 9A-9C are diagrams of examples of code fragments illustrating display customizations that may be implemented by customized display interface 430.

In FIG. 9A, example code 900, that may be implemented as part of customized display interface 430, is illustrated. Code 900 may include definitions for state handler routines 910 and hook routines 920 for display section customization. As illustrated, state handler routines 910 may include definitions for the routines "displayEmptyObject," "displayNonscalarObject," and "displayScalarObject." These routines may be called when the object is empty, non-scalar, and scalar, respectively. Customized display interface 430 may include default implementations for each of these routines. When there is a need to customize an object's display based on the object's state, a class author can customize one or more of these routines while relying on the default implementations for the remaining states. In one implementation, when a customized state routine is implemented, the customized routine becomes responsible for all aspects of the display for the state.

As is further illustrated in FIG. 9A, hook routines 920 may include the routines "getHeader," "getPropertyGroups," and "getFooter." These methods may be called by object that uses a customized display section presentation.

In FIG. 9B, example code 930 is illustrated for a class "Channel." Portions of the class relating to customized display of instances of the class are particularly illustrated. As shown, code 930 may reference customized display interface 430 through reference 935. Code 930 may include a method 940 that overrides the default method relating to the display of scalar objects. In this case, the class author has chosen to provide customized code for the display of scalar objects.

In FIG. 9C, example code 950 is illustrated for a class "SignalReader." Portions of the class relating to customized display of instances of the class are particularly illustrated. As shown, code 950 may reference customized display interface 430 through reference 955. Code 950 may include a method 960 that overrides the default method relating to the display of scalar objects. In this case, the class author has chosen to provide customized code for the display of scalar objects. Routine 960 may generally operate to display a custom header when the object is a scalar and to otherwise call the default "getHeader" display routine.

Although the previous discussion related to the providing of information, for an object, using a command-line interface, concepts consistent with those described above may be applicable to other situations. For example, a text editor or command-line interface may also support graphical interactions, such as popup windows that are displayed in response to a user selecting text with a mouse or hovering over text with a mouse. In one implementation, the command to initiate providing of information about an object may be based on a mouse event (e.g., hovering over an object name or left-clicking to select an object name) and the information may be provided in a popup window, in the command-line editor, or in another graphical element. For example, hovering over an object name may result in display of the informal information for the object and left-clicking on the object name may result in the display of the formal information for the object.

As described above, different display interfaces may be provided to users to display information about an object in a command-line interface. The display interfaces may be targeted and/or optimized for users of an object and for authors of a class or subclass from which an object may be instantiated. The display interfaces may be customized by a class author.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5 and 6, the order of the acts may be modified in other implementations. Further, non-dependent acts may be performed in parallel.

Also, the term "user" has been used herein. The term "user" is intended to be broadly interpreted to include, for example, a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

receiving a command to display information about an object associated with a technical computing environment,
   the receiving the command being performed by the device,
   the object being an instance of a class, and
      the class being defined as a programming construct that is used to generate the instance of the class in the technical computing environment;
determining whether the command is associated with a set of informal display routines or a set of formal display routines based on an identifier associated with the command,
   the determining whether the command is associated with the set of informal display routines or the set of formal display routines being performed by the device,
   the command being associated with the set of informal display routines when a first identifier is associated with the command, and
   the command being associated with the set of formal display routines when a second identifier is associated with the command;
providing the information about the object, for display via an interface using the set of informal display routines, when the command is associated with the set of informal display routines,
the information provided using the set of informal display routines being provided for a first user with respect to the object,
the set of informal display routines causing the information about the object to be displayed, via the interface using the set of informal display routines, in a first plurality of visual formats depending on a state of the object,
the set of informal display routings including one of:
   a first display routine that provides the information about the object for display, via the interface using the set of informal display routines, when the object is a scalar object,
   a second display routine that provides the information about the object for display, via the interface using the set of informal display routines, when the object is not a scalar object, or
   a third display routine that provides the information about the object for display, via the interface using the set of informal display routines, when the object is an empty object array,
the set of informal display routines being overrideable by one or more customized display routines,
   selection of the first display routine, the second display routine, or the third display routine, or overriding the set of informal display routines, for displaying the object, being based on the state of the object to be displayed, and
   the providing the information about the object via the interface using the set of informal display routines being performed by the device; and
providing the information about the object, for display via an interface using the set of formal display routines, when the command is associated with the set of formal display routines,
   the information provided using the set of formal display routines being provided for a second user with respect to the object,
   the set of formal display routines causing the information about the object to be displayed, via the interface using the set of formal display routines, in a second plurality of visual formats depending on the state of the object, and
   the providing the information about the object via the interface using the set of formal display routines being performed by the device.

2. The method of claim 1, further comprising:
determining that the command is associated with the set of formal display routines when the command includes a name of the object and a reference to a name of a display method,
   the command including the name of the object and the reference to the name of the display method corresponding to the second identifier; or
determining that the command is associated with the set of informal display routines when the command includes only the name of the object,
   the command including only the name of the object corresponds to the first identifier.

3. The method of claim 1, where the first user comprises a user that uses the object to perform a technical task in the technical computing environment.

4. The method of claim 1, further comprising:
providing the information about the object, via the interface using the set of formal display routines, for the first user that creates the class for the object.

5. The method of claim 1, further comprising:
providing the information about the object, via the interface using the set of informal display routines, for the first user that uses the object for a technical task.

6. The method of claim 1, further comprising:
providing a customizable display class that, when included in the object, overrides the set of informal display routines to provide a customizable display interface.

7. The method of claim 6, where the customizable display interface includes:
a first set of customizable routines that are called based on the state associated with the object, and
a second set of customizable routines that are called based on display sections associated with providing the information about the object for display.

8. The method of claim 7, where the display sections include one or more of:
a header display section,
a property display section, or
a footer display section.

9. One or more non-transitory computer-readable media storing instructions, the instructions comprising:
one or more instructions that, when executed by one or more processors of a device, cause the one or more processors to:
   receive a command to display information about an object associated with a programming environment,
      the object being generated as an instance of a class,
         the class being defined as a programming construct that is used to generate the instance of the class in the programming environment;
   determine whether the command is associated with a set of informal display routines or a set of formal display routines based on an identifier of the command, the command being associated with the set of informal display routines when a first identifier is associated with the command, and
the command being associated with the set of formal display routines when a second identifier is associated with the command;
provide the information about the object, for display via an interface using the set of informal display routines, when the command is associated with the set of informal display routines,
the information provided using the set of informal display routines being provided for a first user with respect to the object,
the set of informal display routines causing the information about the object to be displayed, via the interface using the set of informal display routines, in a first plurality of visual formats depending on a stat of the object,
the set of informal display routings including one of:
a first display routine that provides the information about the object for display, via the interface using the set of informal display routines, when the object is a scalar object,
a second display routine that provides the information about the object for display, via the interface using the set of informal display routines, when the object is not a scalar object, or
a third display routine that provides the information about the object for display, via the interface using the set of informal display routines, when the object is an empty object array,
the set of informal display routines being overrideable by one or more customized display routines,
selection of the first display routine, the second display routine, or the third display routine, or overriding the set of informal display routines, for displaying the object, being based on the state of the object to be displayed, and
the set of informal display routines being customizable through the programming environment; and
provide the information about the object, for display via an interface using the set of formal display routines when the command is associated with the set of formal display routines,
the information provided using the set of formal display routines being provided for a second user with respect to the object, and
the set of formal display routines causing the information about the object to be displayed, via the interface using the set of formal display routines, in a second plurality of visual formats depending on the state of the object.

10. The one or more non-transitory computer-readable media of claim 9, where the second user is associated with authors of classes or subclasses of the object.

11. The one or more non-transitory computer-readable media of claim 9, where the instructions further comprise:
one or more instructions that, when executed by the one or more processors, cause the one or more processors to:
determine that the command is associated with the set of formal display routines when the command includes a name of the object and a reference to a name of a display method,
where the second identifier is associated with the command when the command includes the name of the object and the reference to the name of the display method; or
determine that the command is associated with the set of informal display routines when the command includes only the name of the object,
where the first identifier is associated with the command when the command includes only the name of the object.

12. The one or more non-transitory computer-readable media of claim 9, where the first user is associated with users of the object.

13. The one or more non-transitory computer-readable media of claim 9, where the instructions further include:
one or more instructions that, when executed by the one or more processors, cause the one or more processors to:
provide the information about the object, via the interface using the set of formal display routines, for the first user that creates the class for the object.

14. The one or more non-transitory computer-readable media of claim 9, where the instructions further include:
one or more instructions that, when executed by the one or more processors, cause the one or more processors to:
providing the information about the object, via the interface using the set of informal display routines, for the first user that uses the object for a technical task.

15. The one or more non-transitory computer-readable media of claim 9, where the set of informal display routines includes:
a first set of customizable methods that are called based on the state of the object, and
a second set of customizable methods that are called based on display sections associated with providing the information about the object for display.

16. The one or more non-transitory computer-readable media of claim 15, where the display sections include one or more of:
a header display section,
a property display section, or
a footer display section.

17. The one or more non-transitory computer-readable media of claim 9, where the set of formal display routines causes more information about the object to be provided for display relative to an amount of information about the object that the set of informal display routines causes to be provided for display via the interface using the set of informal display routines.

18. A device comprising:
a processor to:
receive a command to display information about an object associated with a programming environment, the object being generated as an instance of a class;
determine whether the command is associated with a set of informal display routines or a set of formal display routines based on whether the command is associated with a first identifier or a second identifier,
the command being associated with the set of informal display routines when the command is associated with the first identifier,
the set of informal display routines being associated with a first type of user with respect to the object, the command being associated with the set of formal display routines when the command is associated with the second identifier, and the set of formal display routines being associated with a second type of user with respect to the object; and provide the information about the object for display via one of an interface using the set of informal display routines or an interface using the set of formal display routines based on whether the command is associated with the set of informal display routines or the set of formal display routines, the information about the object being provided using the set of informal display routines when the command is associated with the set of informal display routines, the set of informal display routines causing the information about the object to be displayed, via the interface using the set of informal display routines, in a first plurality of visual formats depending on a state of the object, the set of informal display routines including one of:
a first display routine that provides the information about the object for display, via the interface using the set of informal display routines, when the object is a scalar object,
a second display routine that provides the information about the object for display, via the interface using the set of informal display routines, when the object is not a scalar object,
a third display routine that provides the information about the object for display, via the interface using the set of informal display routines, when the object is an empty object array, the set of informal display routines being overrideable by one or more customized display routines, selection of the first display routine, the second display routine, or the third display routine, or overriding the set of informal display routines, for displaying the object, being based on the state of the object to be displayed, the information about the object being provided using the set of formal display routines when the command is associated with the set of formal display routines, and the set of formal display routines causing the information about the object to be displayed in a second plurality of visual formats depending on the state of the object, the second plurality of visual formats being different from the first plurality of visual formats.

19. The device of claim 18, where the processor is further to:
determine that the command is associated with the set of formal display routines when the command includes a name of the object and a reference to a name of a display method,
the command including the name of the object and the reference to the name of the display method corresponding to the second identifier; or
determine that the command is associated with the set of informal display routines when the command includes only the name of the object,
the command including only the name of the object corresponding to the first identifier.

20. The device of claim 18, where the first type of user is associated with users of the object.

21. The device of claim 18, where the processor is further to:
provide the information about the object, via the interface using the set of formal display routines, for the first type of user that creates the class for the object.

22. The device of claim 18, where the processor is further to:
provide the information about the object, via the interface using the set of informal display routines, for the first type of user that uses the object for a technical task.

23. The device of claim 18, where the processor is further to:
provide a customizable display class that, when included in the object, overrides the set of informal display routines to provide a customizable display interface when the command is associated with the set of informal display routines.

24. The device of claim 23, where the customizable display interface includes one or more of:
one or more customizable methods that are called based on the state of the object, or
one or more customizable methods that are called based on display sections associated with displaying the information about the object via the interface using the set of informal display routines.

25. The device of claim 24, where the display sections include one or more of:
a header display section,
a property display section, or
a footer display section.

* * * * *

UNITED STATES PATENT AND TRADEMARK OFFICE
CERTIFICATE OF CORRECTION

PATENT NO. : 9,665,348 B1
APPLICATION NO. : 13/489948
DATED : May 30, 2017
INVENTOR(S) : Jennifer A. Black et al.

Page 1 of 1

It is certified that error appears in the above-identified patent and that said Letters Patent is hereby corrected as shown below:

On the Title Page

Item (54) and in the Specification, Column 1, Line 4, please correct the Title from "ENVIORNMENT" to --ENVIRONMENT--

In the Claims

Please correct Claim 1 as follows:
Column 13, Line 18, change "performed by the" to --performed by a--

Please correct Claim 18 as follows:
Column 17, Line 30, change "not a scalar object," to --not a scalar object, or a--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*